United States Patent

Mohr et al.

[11] 3,963,436
[45] June 15, 1976

[54] BIS NITROPHENYL DIETHYLENE TRIAMINE DYEING OF SYNTHETIC ACID MODIFIED FIBERS

[75] Inventors: Reinhard Mohr, Offenbach am Main; Konrad Löhe, Rembrucken, both of Germany

[73] Assignee: Hoechst Aktiengesellschaft, Frankfurt am Main, Germany

[22] Filed: Mar. 17, 1975

[21] Appl. No.: 558,784

[30] Foreign Application Priority Data
Mar. 21, 1974 Germany............................ 2413515

[52] U.S. Cl.............................. 8/168 A; 8/177 AB; 8/168 B; 8/168 C; 8/39 A; 8/39 B; 8/39 C; 8/41 B
[51] Int. Cl.²............................................. D06P 5/00
[58] Field of Search...................... 8/168 A–168 D, 8/41 R, 39 R, 177 AB

[56] References Cited
UNITED STATES PATENTS

| | | | |
|---|---|---|---|
| 2,202,169 | 5/1940 | Schlack | 8/94.23 |
| 2,238,949 | 4/1941 | Schlack | 8/29 |
| 3,622,608 | 11/1971 | Schafer | 7/177 AB |

FOREIGN PATENTS OR APPLICATIONS
1,941,376  2/1971  Germany........................ 8/177 AB

*Primary Examiner*—Donald Levy
*Attorney, Agent, or Firm*—Connolly and Hutz

[57] ABSTRACT

Dyestuffs of the formula

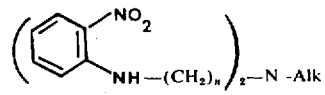

in which Alk is lower alkyl and in which the phenyl nucleus may be further substituted by nonionic substituents and $n$ is 2 to 6, are useful for dyeing polymers containing acidic groups. These dyestuffs yield stable compositions containing 20 to 40 % by weight of one or more of said dyestuffs, 20 to 40 % by weight of an organic solvent, by weight of an organic solvent, 20 to 40 % by weight of a nonionic dispersant of the alkylphenol polyglycolether or fat alcohol polyglycolether type and up to 20 % by weight of water.

8 Claims, No Drawings

BIS NITROPHENYL DIETHYLENE TRIAMINE DYEING OF SYNTHETIC ACID MODIFIED FIBERS

The present invention relates to a process for the dyeing of polymers containing acid groups with alkaline nitro dyestuffs.

It is known that textile material of polyacrylonitrile fibres can be dyed with alkaline nitro dyestuffs of the formula (A)

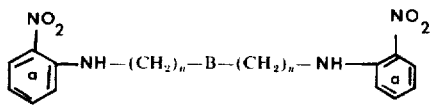 (A)

wherein B represents the —NH— group or a group of the formula

wherein R is an alkyl radical and n stands for an integer of from 2 to 6 and the benzene nuclei $a$ optionally contain further non-ionic substituents (cf. French Pat. Nos. 1,498,006 and 1,498,007 as well as the German Offenlegungsschrift No. 1,941,376).

However, the dyeings obtained with these dyestuffs show certain deficiencies, as for example a low fastness to light and a not very good color build-up.

It has now been found that these deficiencies in the dyeing of polymers containing acid groups can be avoided to a large extent and faster dyeings are obtained, when using dyestuffs of the formula (I)

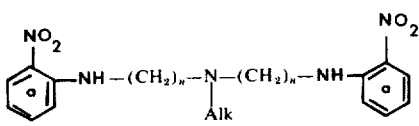 (I)

wherein Alk is alkyl with 1 to 6 carbon atoms and $n$ stands for an integer of from 2 to 6 and the bezene radicals $a$ may be substituted by further non-ionic substituents.

The dyestuffs have proved particularly advantageous, which correspond to the formula (II)

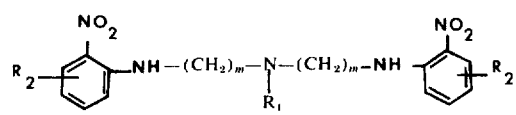 (II)

wherein $R_1$ is alkyl having 1, 2 or 3 carbon atoms and m is the integer 2 or 3 and $R_2$ represents hydrogen, chlorine, bromine, a carbalkoxy group having 2 to 5 carbon atoms, the nitro group, the sulfonamide, carbonamide, lower monoalkyl or lower dialkylsulfonamide or carbonamide groups or the cyano, methyl, ethyl, methoxy, ethoxy, acetylamino or methyl- or ethylsulfonyl group; as especially advantageous there may be mentioned above all those corresponding to the formula (II) wherein $R_1$ is methyl or ethyl, preferably methyl, $R_2$ is hydrogen and $m$ is 2 or 3.

The dyestuffs used according to the invention may be obtained in known manner by reacting one mol of a triamine of the formula III

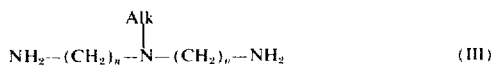 (III)

wherein $n$ and Alk have the above meaning, with at least 2 mols of a compound of the formula IV

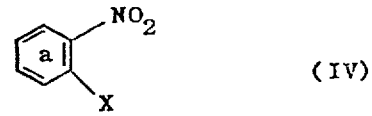 (IV)

wherein X is a chlorine or bromine atom and $a$ has the meaning given above, in the presence of acid-binding agents.

Substituents which may be additionally contained in the benzene nucleus $a$ of the formulae (I) and (IV) are for example halogen atoms, such as chlorine or bromine atoms, alkyl groups, especially those having 1 to 4 carbon atoms, alkoxy groups, especially those having 1 to 4 carbon atoms, aralkoxy groups, such as the benzyloxy or phenethyloxy groups, aryl groups, as for example the phenyl group, acyl especially lower alkanoyl, such as acetyl or propionyl, or benzoyl, aryloxy such as phenoxy, azo such as phenylazo, aralkyl such as benzyl or phenethyl, carboxylic acid ester groups, especially carboxylic acid alkyl ester groups having 1 to 4 carbon atoms in the alkyl radical, optionally substituted, especially alkylated carboxylic acid amide groups, cyano, nitro, hydroxy, tri-fluoromethyl, alkylsulfonyl groups, especially those having 1 to 4 carbon atoms, arylsulfonyl especially phenyl or tolyl sulfonyl, acyloxy especially lower alkanoyloxy such as acetoxy or propionyloxy or benzoyloxy, acylamino, especially benzoylamino or lower alkanoylamino groups, alkyl-sulfonylamino groups, especially those having 1 to 4 carbon atoms, or arylsulfonylamino groups, such as the phenyl or p-toluyl-sulfonylamino group.

The dyestuffs may be applied in the form of the free bases as well as in the form of the salts thereof with organic or inorganic acids, for example as salts of hydrohalic acids, for example hydrochloric acid, phosphoric acids, of sulfuric acid, nitric acid, boric acid, sulfamic acid, or lower aliphatic carboxylic acids, as for example the formic acid, acetic acid, propionic acid or lactic acid, or of aromatic carboxylic acids, for example benzoic acid.

The dyeing of textile materials is carried out by treating the material of acidic baths, preferably in baths containing acetic acid or a mineral acid, which contain the dyestuff and optionally auxiliaries, and completing the dyeings thus obtained in usual manner. Generally, the material is introduced into the dyebath at about 40° to 60°C and dyed at boiling temperature. The material may also be dyed under pressure above 100°C.

To print textile materials the dyestuffs are used together with the usual acidic thickeners and, if desired, printing auxiliaries and the dyestuffs are fixed in usual manner by steaming.

The dyeing may also be carried out in an organic solvent, for example in an aliphatic chlorohydrocarbon, in the presence of amines, aminoxides or ammonium compounds and, if desired, emulsifiers.

To prepare the aqueous dyebaths and printing pastes the dyestuffs may be used in the form of powders which optionally contain a solid acid, for example oxalic acid, boric acid or sulfamic acid, an acidic sulfate or phosphate and/or another diluent, as for example inorganic salts, dextrin, sugar and, if desired, further additives. However, it is more advantageous to use concentrated aqueous solutions of the dyestuffs easier to handle, which contain about 20 to 60 percent of dyestuff, one or more lower aliphatic carboxylic acids, such as formic acid, acetic acid, propionic acid or lactic acid, as well as, if desired, further additives, as for example water-soluble polyhydric alcohols, such as ethylene glycol, the ethers or esters thereof, polyethers, aliphatic carboxylic acid amides, lactames, lactones, nitriles, dimethylsulfoxide, diacetone-alcohol, dioxane, tetrahydrofuran or urea as well as water.

To prepare the dyebaths which contain only organic solvents, for example chlorohydrocarbons, there are preferably used concentrated solutions containing the dyestuff as a free base or as a salt of a mono-basic organic acid, chlorohydrocarbons, organic acids and polar organic solvents.

As textile material there are mentioned for example fibres, threads, flocks, woven and knitted fabrics of polymers of acrylonitrile or of mixed polymers of acrylonitrile with other vinyl compounds, for example vinyl chloride, vinyl fluoride, vinylidene chloride, vinyl acetate or propionate, vinyl pyridine, vinyl imidazole, vinyl pyrrolidone, vinyl alcohol, acrylic- or methacrylic acid esters or acrylamides which contain acid groups due to the preparation. Furthermore, there are considered acid-modified polyacrylo-nitrile materials, as they are described for example in U.S. Pat. Nos. 2,837,500 and 2,737,501, as well as acid-modified polyamide fibres, as for example poly-condensation products from 4,4'-diamino-2,2'-diphenyl-disulfonic acids or 4,4'-diamino-2,2'-diphenyl-alkanedisulfonic acids with starting substances forming polyamide, polycondensation products or monoaminocarboxylic acids or the amide-forming derivatives or dibasic carboxylic acids and diamines with aromatic dicarboxy-sulfonic acids, for example polycondensation products of caprolactam or hexamethylenediammonium -diammonium adipate with potassium-3,5-dicarboxybenzene-sulfonate, or acid-modified polyester fibres, such as polycondensation products or aromatic polycarboxylic acid, for example terephthalic acid or isophthalic acid, with polyhydric alcohols, as for example ethylene glycol and 1,2- or 1,3-dihydroxy-3-(3'-sodiumsulfopropoxy)-propane, 2,2-dimethylol-1-(3'-sodium-sulfopropoxy)-butane, 2,2-bis-(3'-sodiumsulfopropoxyphenyl)-propane or 3,5-dicarboxybenzene-sulfonic acid or sulfonated terephthalic acid, sulfonated 4-methoxy-benzenecarboxylic acid or sulfonated diphenyl-4,4'-dicarboxylic acid.

The dyeing may also be carried out by adding the dyestuffs to the spinning solutions used for preparing polyacrylonitrile fibres containing acid groups, or by applying the dyestuff solution onto the unstretched (undrawn) fibre.

The dyeings and prints obtained with the dyestuffs of the invention are characterized by a good fastness to light and to wetting, for example a good fastness to washing, fulling, cross-dyeing, to chlorine, perspiration and carbonization, as well as by a good fastness to decatizing, steaming, ironing, rubbing and to solvents.

As compared with the dyeings obtained with dyestuffs of French Patent Nos. 1,498,006 and 1,498,007 and German Offenlegungsschrift No. 1,941,376, the dyeings obtained with the dyestuffs of the invention have surprisingly a better fastness to light and a better color build-up.

The following Examples illustrate the invention.

EXAMPLE 1

100 g of a pre-cleaned polyacrylonitrile yarn were introduced into a dyebath heated to 60°C which contained 1 g of crystalline sodium acetate and 5 g of calcinated sodium sulfate; the liquor was circulated for about 10 minutes and subsequently a solution of 1 g of dyestuff of the formula

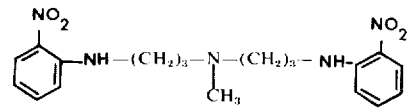

and 3 ml of a 60% acetic acid in 1 liter of water were added. Then the bath temperature was raised to 85°C, then slowly to 100°C at a temperature increase of 1°C per 3 to 4 minutes.

After reaching the boiling temperature the yarn was dyed for 1 to one and a half hours, whereby the bath nearly exhausted. Subsequently the dyebath was cooled to about 70°C, the dyeing good was removed, rinsed warm and cold and dried. A clear yellow dyeing was obtained which had very good fastnesses to wetting and good fastness to light.

EXAMPLE 2

5 g of dyestuff of the formula

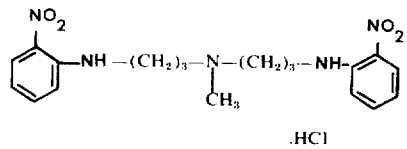

were stirred with 15 ml of a 60 % acetic acid and dissolved in one liter of boiling water. This solution was poured into a dyebath containing in 5 liters of water of 60°C 1.2 g of a dispersing agent of the alkylarylpolyglycol ether type, 5 g of crystalline sodium acetate and 50 g of calcinated sodium sulfate.

Then a pre-cleaned cross-wound bobbin containing about 500 g of polyacrylonitrile yarn was introduced into the dyebath, the bath was heated to 85°C and then the temperature was slowly increased to 100°C. The whole was dyed for one hour at this temperature, whereby the dyebath exhausted.

Then the dyebath was cooled to 70°C and the dyeing was completed as usual. A clear yellow dyeing was obtained having a very good fastness to wetting and a good fastness to light.

EXAMPLE 3

20 g of dyestuff of the formula

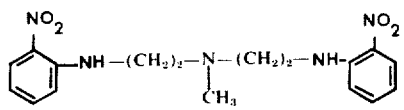

were dissolved hot with 50 g of β, β'-dihydroxydiethyl sulfide, 30 g of cyclohexanol, 25 g of a 60 % acetic acid and 425 g of water, and the solution was introduced, while stirring, into 450 g of a crystal gum thickener.

A polyacrylonitrile fabric was printed with this printing paste, dried and steamed for half an hour at 0.2 atmospheres gage. Then the whole was rinsed and completed in usual manner.

A clear yellow print was obtained having a very good fastness to wetting and a good fastness to light.

EXAMPLE 4

100 g of a pre-cleaned yarn of acid-modified polyester were introduced into a dyebath heated to about 60°C, which contained 18 g of calcinated sodium sulfate and 6 g of a carrier (a mixture of diphenyl and methyl naphthalene) in 3 liters of water, the bath was circulated for about 10 minutes and then a solution of 1 g of dyestuff of the formula

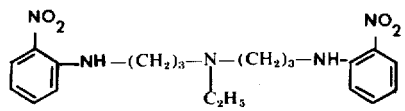

and 3 ml of a 60 % acetic acid in one liter of water were added. The bath temperature was slowly increased (1°C per minute) to 100°–110°C and the temperature was maintained for one hour.

Then the dyebath was discharged as hot as possible, the dyed material was rinsed hot and completed as usual.

A clear yellow dyeing having a good fastness to light and to wetting was obtained.

The following Table contains further dyestuffs of the formula I used according to the invention as well as shades of the dyeings on polyacrylonitrile fibres:

| Alk | n | Substituent in a | Shade |
|---|---|---|---|
| $CH_3$ | 3 | 4 - Cl | yellow |
| $CH_3$ | 3 | 4 - $COOCH_3$ | yellow |
| $CH_3$ | 3 | 4 - $NO_2$ | yellow |
| $CH_3$ | 3 | 4 - $SO_2NH_2$ | yellow |
| $CH_3$ | 3 | 4 - $CONH_2$ | yellow |
| $CH_3$ | 3 | 4 - $CF_3$ | yellow |

We claim:

1. In a process for the dyeing of high-molecular substrates containing acidic groups with basic nitro groups containing dyestuffs the improvement consisting of contacting said substrate with a dyestuff of the formula

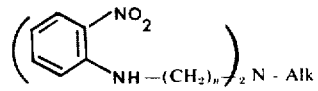

wherein Alk is alkyl of 1 to 6 carbon atoms, $n$ is 2 to 6 and wherein the phenyl nuclei can be substituted by halogen, carboalkoxy of 2 to 5 carbon atoms, nitro, sulfamoyl, sulfon amide mono- or di-(lower alkyl)-amide, carbamoyl, carboxylic acid mono- or di-(lower alkyl)-amide, cyano, lower alkyl, lower alkoxy, lower alkanoylamino or lower alkylsulfonyl or a mixture of said dyestuffs.

2. A process as claimed in claim 1, wherein the high-molecular substrate is a polymer of acrylonitrile, a polyamide or a polyester.

3. A process as claimed in claim 1, wherein said substrate is a fiber material.

4. A process as claimed in claim 1, wherein the dyestuff has the formula

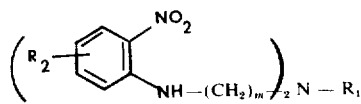

wherein $R_1$ is alkyl of 1 to 3 carbon atoms, $m$ is 2 or 3, and $R_2$ is hydrogen, chlorine, bromine, carboalkoxy of 2 to 5 carbon atoms, nitro, sulfamoyl, carbamoyl, carboxylic or sulfonic acid mono- or di-alkyl amide with alkyl moieties of 1 to 4 carbon atoms, cyano, methyl, ethyl, methoxy, ethoxy, acetamino, methyl sulfonyl or ethyl sulfonyl.

5. A process as claimed in claim 4, wherein $R_1$ is methyl or ethyl and $R_2$ is hydrogen.

6. A process as claimed in claim 5, wherein $R_1$ is methyl.

7. A process as claimed in claim 1, wherein contacting is effected by immersing the substrate into an aqueous bath of 40° to 120°C of a pH value below 7 containing said dyestuff.

8. A process as claimed in claim 1, wherein contacting is effected by printing the substrate with a printing paste containing said dyestuff.

* * * * *